United States Patent [19]

Schiefer

[11] Patent Number: 4,673,322

[45] Date of Patent: Jun. 16, 1987

[54] SLOTTED ANCHORING BUSH

[75] Inventor: Erwin Schiefer, Munich, Fed. Rep. of Germany

[73] Assignee: Hilti Aktiengesellschaft

[21] Appl. No.: 891,364

[22] Filed: Jul. 29, 1986

[30] Foreign Application Priority Data

Jul. 29, 1985 [DE] Fed. Rep. of Germany ....... 3527092

[51] Int. Cl.[4] ......................... F16B 13/04; F16B 13/06
[52] U.S. Cl. ...................................... 411/40; 411/62; 411/44
[58] Field of Search ................................... 411/24–28, 411/39–42, 44, 55, 57, 60, 62, 58, 59, 61

*Primary Examiner*—Gary L. Smith
*Assistant Examiner*—Neill Wilson
*Attorney, Agent, or Firm*—Toren, McGeady & Associates

[57] ABSTRACT

An axially extending anchoring bush has a pair of opposite ends with a blind borehole extending axially into the bush from one end with the blind borehole arranged to receive and secure an anchor bolt. The bush has at least three generally axially extending slots ranging from the end opposite the end in which the blind borehole is formed toward the other end. Each slot is located in a different plane with the planes extending obliquely of the axis of the bush. Slots extend inwardly from the axially extending outer surface of the bush and intersect inwardly of the outer surface. The planes of the slots define the axially extending sides of a pyramidally shaped expansion member located inwardly of the slot.

10 Claims, 9 Drawing Figures

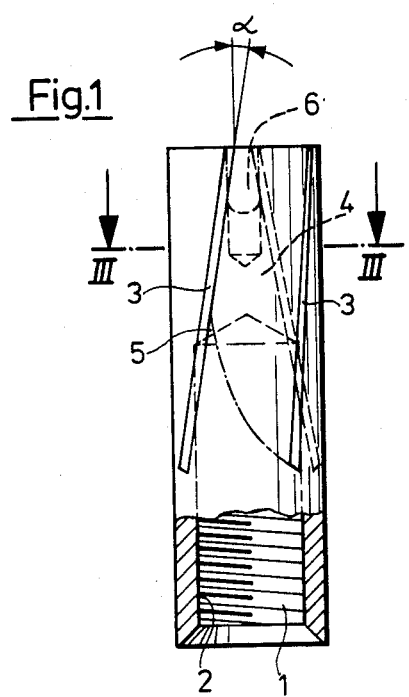
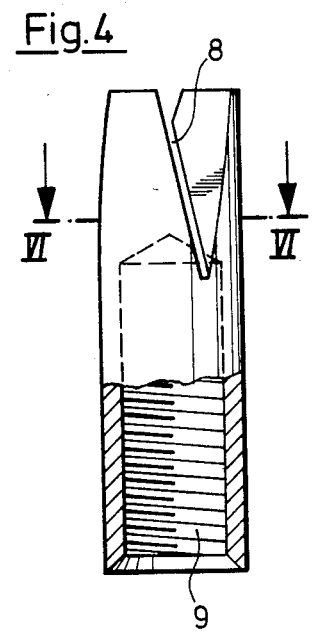
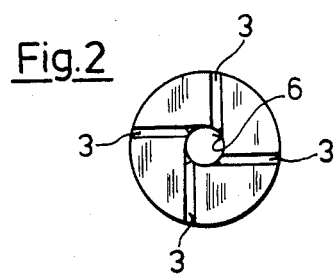
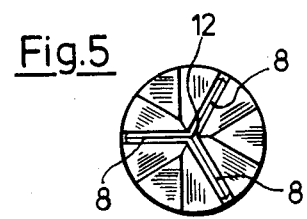
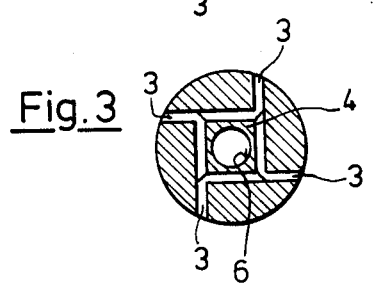
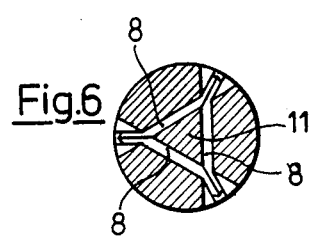

SLOTTED ANCHORING BUSH

BACKGROUND OF THE INVENTION

The present invention is directed to an anchoring bush with a blind borehole arranged to receive and secure an anchoring bolt.

Known anchoring bushes or sleeves can be anchored in bores formed in soil and serve to secure anchor bolts with the anchoring bush having engagement means, such as an internal thread, for securing an anchoring bolt. A blind borehole extends along a portion of the axial length of the anchoring bush and is a centrally arranged bore with a female thread. The blind borehole is closed at its base by an expansion member.

The fabrication of the anchoring bush or sleeve with an associated expansion member is very expensive. Moreover, there is the problem that the expansion member may be lost either during packaging or at the location where the anchoring bush is to be used.

SUMMARY OF THE INVENTION

Therefore, the primary object of the present invention is to provide an anchoring bush for anchor bolts which is distinguished by a simple and inexpensive arrangement and by the positive retention of the expansion member so that it cannot be lost.

In accordance with the present invention, the anchoring bush or sleeve is provided with at least three axially extending slots extending into the bush from the end opposite the end in which the blind borehole is formed. The slots are located in planes inclined obliquely to the bush axis in the region of the bush outside of the blind borehole. The slots intersect one another in the axial direction with each slot extending inwardly from the outside surface of the bush to a line of intersection with another slot inwardly of the outside surface.

Initially, a blind borehole is drilled into one end of a cylindrically shaped solid blank so that the borehole base is spaced from the other end of the blank. A pyramidally shaped expansion member is formed within the blank extending from the base of the blind borehole to the opposite end of the blank.

The expansion member is defined by the axially extending slots and, depending on the inclination of the slots, the depth inwardly from the outside surface, and the axial length of the slots, the expansion member is connected with the remaining portion of the anchoring bush by the material forming the blank with the connecting portions acting as preset breaking or failure points. Accordingly, the base of the blind borehole forms the larger area end face of the pyramidally shaped expansion member.

To install the anchoring bush in a receiving bore, blows are applied to the end face of the expansion member at the base of the blind borehole using a bolt-shaped tool. Due to the blows applied, the expansion member is separated from the remaining portion of the anchoring bush by the failure of the preset breaking points and is driven in the insertion direction of the anchoring bush. The surfaces of the expansion member extending in the axial direction of the bush moves along the inclined surfaces of the finger-like segments formed by the longitudinal slots with the segments being pressed radially outwardly against the surface of the receiving bore.

Preferably, the axially extending slots are inclined obliquely to the bush axis within an angular range of 5° to 20°, preferably within a range of 7° to 12°. While a smaller angle of inclination is suitable for harder soils, larger angles are needed for softer soils. The range of inclination permits a high expansion effect and, as a result, a high anchoring value with small driving force being applied to the expansion member.

In one preferred embodiment, three generally axially extending slots are formed in the region of the blank outside of the blind borehole. The slots are uniformly distributed in circumferential direction of the blank. Accordingly, with three slots an expansion member with an equilateral triangular cross-section is formed inwardly of the slots.

Preferably, the planes of the slots intersect in the axial direction in the region of the blank not penetrated by the blind borehole. Since the planes of the slots taper inwardly toward the opposite end of the blank from the end in which the blind borehole is formed, a pyramidally shaped expansion member is formed in the axially extending part of the anchoring bush extending from the base of the blind borehole toward the opposite end of the bush. With such an arrangement there is the advantage that the anchoring bush can be inserted against an abutment in the bottom of an insertion bore and, subsequently, the expansion member can be axially displaced for expanding the bush without being hindered by the bottom of the insertion bore.

According to another feature of the invention, the planes of the generally axially extending slots intersect in the axial direction in the region of the bush not penetrated by the blind borehole and extending from the blind borehole to the opposite end of the bush. In particular, with the combination of the minor inclination of the slots, it is possible to retain the original surface of the outside of the anchoring bush so that high anchoring values can be achieved. The displacement of the expansion member into the expansion position can be effected without any interference in this arrangement with the centrally arranged bore extending axially into the other end of the bush from the end in which the blind borehole is formed so that the bore does not reach the blind borehole. Accordingly, the smaller end of the expansion member spaced from the base of the blind borehole can move axially through the portion of the expansion bush ahead of the blind borehole affording a certain amount of free axial travel for the expansion member after the breaking points have failed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of an anchoring bush embodying the present invention, shown in partly in section;

FIG. 2 is a plan view of the upper end of the anchoring bush as shown in FIG. 1;

FIG. 3 is a sectional view through the anchoring bush taken along the line III—III in FIG. 1;

FIG. 4 is an elevation view similar to that shown in FIG. 1 illustrating another embodiment of the anchoring bush incorporating the present invention with a portion of the bush shown in section;

FIG. 5 is a plan view of the upper end of the anchoring bush shown in FIG. 4;

FIG. 6 is a sectional view taken along line IV—IV of the anchoring bush shown in FIG. 4;

DETAILED DESCRIPTION OF THE INVENTION

Figure 7:
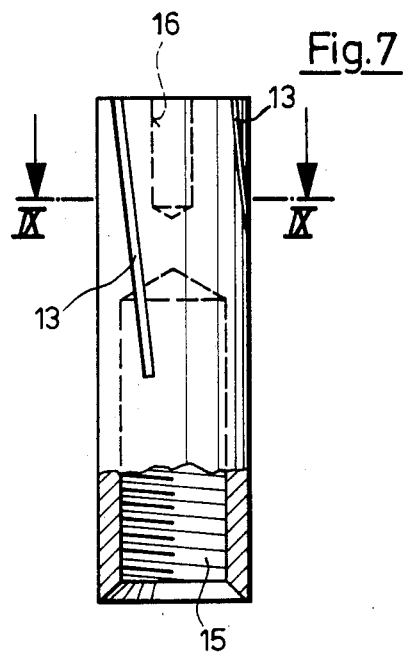
FIG. 7 is still another embodiment of an anchoring bush incorporating the present invention with an axially extending part of the bush shown in section.

The anchoring bush displayed in FIG. 1 is an axially extending member with a cylindrically shaped outside surface. The anchoring bush has a leading or first end located at its upper end in FIG. 1 and a trailing or second end located at its lower end. The first end is inserted first into a receiving borehole. A centrally arranged blind borehole 1 is formed in the anchoring bush extending from the second end toward the first end, however, the base of the borehole 1 is spaced axially from the first end. A female thread 2 is provided in the borehole for securing an anchor bolt, not shown. Starting from the first end of the anchoring bush there are four generally axially extending slots which extend not only in the axial direction but also inwardly from the cylindrically shaped outside surface of the bush.

The generally axially extending slots end in the bottom region of the blind borehole 1 and are located outwardly from the blind borehole. The slots 3 extend inwardly from the outside surface of the anchoring bush and intersect with at least two of the other slots, note FIG. 3. This intersecting arrangement is afforded over at least an axially extending part of the slot lengths from the first end of the anchoring bush. The slots 3 are located in planes disposed at an oblique angle α of approximately 10° with respect to the axis of the bush with the portion of the bush located inwardly from the slots forming a pyramidally shaped expansion member 4 extending from the base of the blind borehole toward the first end of the bush. The expansion member is connected by means of breaking lines 5 formed by the remaining residual crosssection between the longitudinal slot 3 and the surface of the blind borehole 1. The outer surface of the expansion member, having four sides as viewed in FIG. 3, tapers inwardly toward the first end of the anchoring bush and the end of the expansion member 4 closer to the first end of the bush is spaced axially from the first end. This axial spacing is afforded by a central bore 6 extending axially into the bush from the first end, note FIGS. 1, 2 and 3. The formation of the borehole 6 removes the free end region of the expansion member adjacent the first end of the bush.

To secure the anchoring bush in a receiving bore, after the bush is inserted into the bore, the expansion member 4 is displaced toward the first end of the bush moving along the generally axially extending slots 3 due to applying blows against the base of the blind borehole 1 after the destruction of the breaking points or lines 5. Due to the inclined arrangement of the slots 3 relative to the axis of the bush and the outside contour of the expansion member 4, the remaining portions of the bush outwardly of the expansion member are pressed or expanded radially outwardly into holding engagement with the receiving bore.

In the expansion bush displayed in FIG. 1, the axially extending slots 3 extend chordally so that the slots are spaced radially outwardly from the center or axis of the anchoring bush. Accordingly, the planes of the slots intersect one another in the axial direction outwardly from the first end of the anchoring sleeve. In this arrangement, the expansion member 4 could extend up to the first end of the anchoring bush. Another embodiment of the anchoring bush is shown in FIG. 4 where three generally axially extending slots intersect in the region of the anchoring bush between the base of a blind borehole 9 and the first end of the bush. In this embodiment a pyramidally shaped expansion member 11 of triangular crosssection is formed inwardly of the slots 8. This expansion member is connected at its larger end with the anchoring bush by breaking points or lines not illustrated. The free pointed end 12 of the expansion member 11, that is the end closer to the first end of the bush, is set inwardly from the first end so that a displacement of the end 12 of the expansion member toward the first end of the bush is possible.

As distinguished from the anchoring bush shown in FIGS. 1 to 3, the slots 8 are formed to be continuous in the radial direction of the anchoring sleeve in the embodiment set forth in FIGS. 4 to 6.

Figure 8:
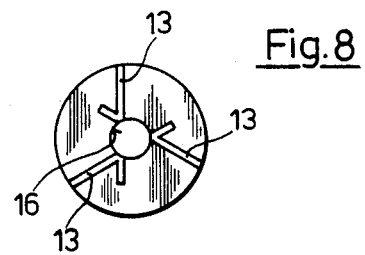
FIG. 8 is a plan view of the upper end of the anchoring bush as viewed in FIG. 7.
Figure 9:
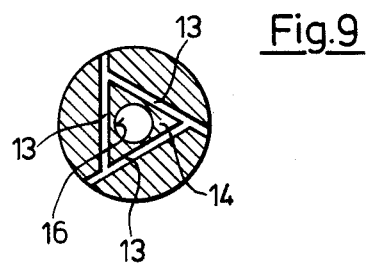
FIG. 9 is a sectional view taken along the line IX—IX in FIG. 7.

In FIGS. 7 to 9 an anchoring bush is displayed with three generally axially extending slots 13 with the slots extending inwardly from the cylindrically shaped outside surface of the bush. The planes of the slots, similar to the embodiment shown in FIG. 1, intersect in the axial direction outwardly from the end of the anchoring bush. A parametrally shaped expansion member 14 with a triangular cross-section extends from the base of the blind borehole 15 to the base of the centrally arranged bore 16 formed inwardly from the first end of the bush toward the blind borehole 15. As can be seen in FIG. 7, the base of the bore 16 is spaced axially from the base of the blind borehole 15.

While specific embodiments of the invention have been shown and described in detail to illustrate the application of the inventive principles, it will be understood that the invention may be embodied otherwise without departing from such principles.

I claim:

1. An anchoring bush comprising an axially extending member having a first end and a second end spaced apart in the axial direction and a generally cylindrically shaped outer surface between said first and second ends, a blind borehole formed in said member in the axial direction thereof from the second end toward the first end, said blind borehole having a base intermediate said first and second ends, means in said blind borehole for securing a fastening member to said anchoring bush, at least three slots formed in said member extending from the first end thereof toward the second end, each of said slots being located in a different plane inclined at an oblique angle to the axis of said member, said slots being located outwardly from said blind borehole, said slots being in intersecting relation in the axial direction of said member with each of said slots extending inwardly from the said outer surface and intersecting at least another one of said slots.

2. An anchoring bush, as set forth in claim 1, wherein said slots are inclined at an oblique angle to the axis of said member in the range of 5° to 20°.

3. An anchoring bush, as set forth in claim 2, wherein said slots are inclined relative to the axis of said member at an angle in the range of 7° to 12°.

4. An anchoring bush, as set forth in claim 1, 2 or 3, wherein three said slots are formed in the axially extending region of said member not penetrated by the blind borehole.

5. An anchoring bush, as set forth in claim 1, 2 or 3, wherein the planes of said slots intersect in the axial direction within the region of said member not penetrated by said blind borehole.

6. An anchoring bush, as set forth in claim 1, 2 or 3, wherein the planes of said slots intersect in the axial direction in the axially extending region of said member between the base of said blind borehole and the first end of said member.

7. An anchoring bush, as set forth in claim 1, 2 or 3, wherein a bore is formed in the axial direction of said member extending inwardly from the first end thereof toward the base of said blind borehole with said bore extending for a portion of the axial length of said member between the first end and the base of said blind borehole.

8. An anchoring bush, as set forth in claim 4, wherein an axially extending three-sided pyramidally shaped expansion member is formed inwardly of and is defined by said slots.

9. An anchoring bush, as set forth in claim 1, wherein four generally axially extending slots are formed in said member, and an axially extending four-sided pyramidally shaped expansion member is formed inwardly of said slots.

10. An anchoring bush, as set forth in claim 1, wherein an axially extending expansion member is formed within said member inwardly of said slots and is defined by said slots, said expansion member is pyramidally shaped and has a larger area end and a smaller area end with the larger area end located at the base of said blind borehole and the smaller diameter end located between the base of said borehole and the first end of said member and spaced axially from the first end.

* * * * *